US010640087B2

(12) United States Patent
Jawany et al.

(10) Patent No.: US 10,640,087 B2
(45) Date of Patent: May 5, 2020

(54) DEAD ZONE MITIGATION FOR A PASSIVE ENTRY SYSTEM OF A VEHICLE

(71) Applicant: Ford Global Technologies, LLC, Dearborn, MI (US)

(72) Inventors: Jalal Jawany, Canton, MI (US); Vivekanandh Elangovan, Canton, MI (US); Ali Hassani, Ann Arbor, MI (US); Patricia Seashore, Dearborn, MI (US); Timothy Thivierge, Jr., Carleton, MI (US); Yasmin Jawad, Dearborn Heights, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/900,135

(22) Filed: Feb. 20, 2018

(65) Prior Publication Data
US 2019/0256049 A1 Aug. 22, 2019

(51) Int. Cl.
| | | |
|---|---|---|
| *B60R 25/00* | (2013.01) |
| *G05B 19/00* | (2006.01) |
| *G05B 23/00* | (2006.01) |
| *G06F 7/00* | (2006.01) |
| *G06F 7/04* | (2006.01) |
| *G08B 29/00* | (2006.01) |
| *G08C 19/00* | (2006.01) |
| *H04B 1/00* | (2006.01) |
| *H04B 3/00* | (2006.01) |
| *H04Q 1/00* | (2006.01) |
| *H04Q 9/00* | (2006.01) |
| *B60R 25/24* | (2013.01) |
| *G07C 9/00* | (2020.01) |
| *B60R 25/01* | (2013.01) |
| *G07C 9/29* | (2020.01) |
| *H04W 4/021* | (2018.01) |

(52) U.S. Cl.
CPC .......... *B60R 25/245* (2013.01); *B60R 25/01* (2013.01); *G07C 9/00309* (2013.01); *G07C 9/29* (2020.01); *B60R 2325/205* (2013.01); *G07C 2209/64* (2013.01); *H04W 4/021* (2013.01)

(58) Field of Classification Search
CPC . B60R 25/245; B60R 25/01; B60R 2325/205; G07C 9/00309; G07C 9/00119; G07C 2209/64; H04W 4/021
USPC ........................................................ 340/5.72
See application file for complete search history.

(56) References Cited

U.S. PATENT DOCUMENTS 6,552,649 B1 4/2003 Okada et al.
9,008,917 B2 4/2015 Gautama et al.
(Continued)

*Primary Examiner* — Tanmay K Shah
(74) *Attorney, Agent, or Firm* — Frank Lollo; Eversheds Sutherland (US) LLP

(57) ABSTRACT

Method and apparatus are disclosed for dead zone mitigation for a passive entry system of a vehicle. An example vehicle includes antenna modules to measure signal strengths of broadcasts from a mobile device. The example vehicle also includes a wireless module to, when the mobile device is in a dead zone, generate first and second predictors and enable passive entry when the first and second predictors match and indicate that the mobile device is in a passive entry zone, and a sensor detects a user. The example vehicle also includes a body control module to unlock a door when passive entry is enabled.

19 Claims, 3 Drawing Sheets

(56) References Cited

U.S. PATENT DOCUMENTS

| | | |
|---|---|---|
| 9,679,430 B2 | 6/2017 | O'Brien et al. |
| 2012/0092129 A1* | 4/2012 | Lickfelt .................. B60R 25/24 340/5.72 |
| 2014/0253288 A1* | 9/2014 | O'Brien ............. G07C 9/00309 340/5.61 |
| 2015/0300046 A1* | 10/2015 | Lange .................... B60R 21/02 701/49 |
| 2016/0320469 A1 | 11/2016 | Laifenfeld et al. |
| 2017/0103592 A1 | 4/2017 | Buttolo et al. |

* cited by examiner

DEAD ZONE MITIGATION FOR A PASSIVE ENTRY SYSTEM OF A VEHICLE

TECHNICAL FIELD

The present disclosure generally relates to passive entry passive start systems of a vehicle and, more specifically, dead zone mitigation for a passive entry system of a vehicle.

BACKGROUND

Increasingly, vehicles are being manufactured with passive entry passive start (PEPS) systems. In PEPS systems, the vehicle controls various functions of the vehicle based on the location of the driver's key fob or mobile device (e.g. when the vehicle includes a "phone-as-a-key (PaaK)" system) relative to the vehicle. For example, at when the mobile device is three meters from the vehicle, the vehicle may engage a welcome mode that illuminates the exterior lights of the vehicle and adjust the cabin to suite the driver preferences and at two meters, the vehicle may enable a passive entry system based on trigger from the user such as sensing a hand touching a door handle or a foot kicking under the fascia.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for dead zone mitigation for a passive entry system of a vehicle. An example vehicle includes antenna modules to determine signal strength measurements of broadcasts from a mobile device. An example vehicle includes antenna modules to measure signal strengths of broadcasts from a mobile device. The example vehicle also includes a wireless module to, when the mobile device is in a dead zone, generate first and second predictors. The wireless modules also enables passive entry when the first and second predictors match and indicate that the mobile device is in a passive entry zone, and a sensor detects a user. The example vehicle also includes a body control module to unlock a door when passive entry is enabled.

An example method includes determining, with antenna modules of a vehicle, signal strength measurements of broadcasts from a mobile device. The example method also includes, when the mobile device enters into a dead zone near the vehicle, generating, with a wireless module that includes a processor and memory, multiple predictors. The example method includes enabling, with the wireless module, passive entry when the multiple predictors match and indicate that the mobile device is in a passive entry zone. Additionally, the example method included unlocking, with a body control module, a door when passive entry is enabled and a sensor detects a user touch a handle of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
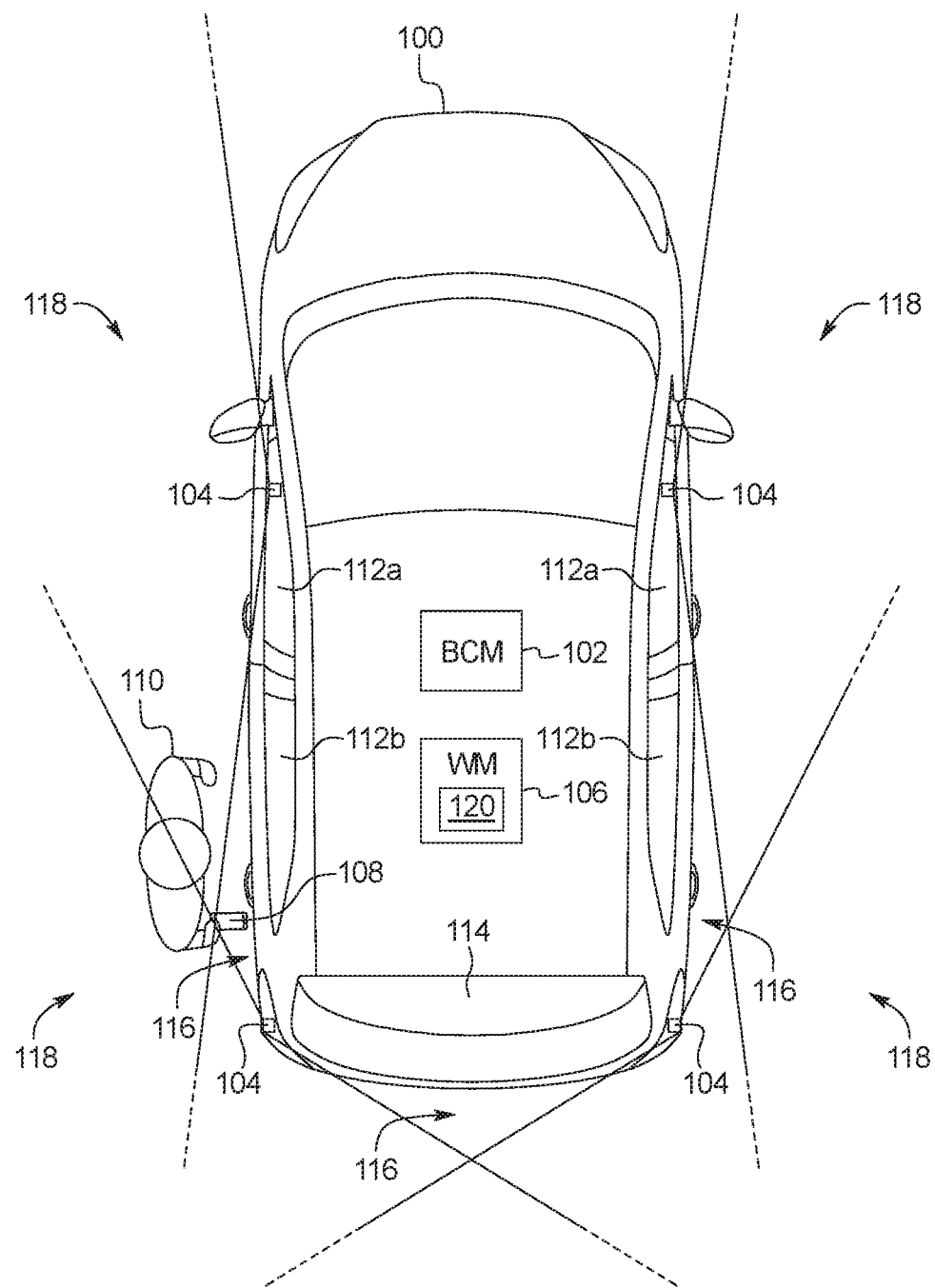
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Passive entry passive start (PEPS) systems facilitate an operator using various features of a vehicle while keeping the key within the proximity of the vehicle. These features include a welcome mode, passive entry, and passive start. At a first distance (e.g., three meters, etc.) from the vehicle, the PEPS system activates a welcome mode that, for example, illuminates the exterior lights of the vehicle and/or change setting of the interior system (e.g., the seat position, the steering wheel position, the radio presets, etc.) to the preferences of the operator associated with the mobile device and/or key fob at a second distance (e.g., two meters, etc.), the PEPS system primes one or more doors to be opened. As used herein, "priming" refers to sending a signal to a door control unit to authorize unlocking the door in response to detecting a hand on the door handle. When a door has been primed, the PEPS system (e.g., via a door control unit) unlocks the door in response to detecting (e.g., via a touch sensor, an infrared sensor, or a camera, etc.) the hand of the operator be proximate to the door when the authorized mobile device and/or key fob is also in the passive entry zone. When the authorized mobile device and/or key fob is inside the vehicle, the PEPS system enables passive start. The detection of mobile device and/or key fob inside the vehicle disables the immobilizer and enables a push-button ignition switch.

The PEPS system tracks a location of an authorized mobile device (e.g., a smart phone, a smart watch, tablet, a key fob, etc.) and activates these features based on the location of the mobile device relative to the vehicle. To localize the mobile device, the vehicle includes antenna modules and a wireless communication module. The antenna modules provide wireless communication coverage with an area around the vehicle to communicate with the mobile device. The antenna modules implement a personal area network protocol (e.g., Bluetooth® Low Energy (BLE), Z-Wave®, ZigBee®, etc.) or a wireless local area network (WLAN) protocol (including IEEE 802.11 a/b/g/n/ac/p or others). When the antenna modules implement BLE, the antenna modules are sometimes referred to as "BLE Antenna Modules (BLEAMs)" and the wireless communication module is sometimes referred to as a "BLE Module (BLEM)." The antenna modules measure a signal strength value, such as a received signal strength indicator (RSSI) and/or a reception strength (RX) value, of signals from the mobile device. The RSSI and RX values measure the open-path signal strength of the radio frequency signal as received by the antenna module from the mobile device. The RSSI is measured in signal strength percentage, the values (e.g., 0-100, 0-137, etc.) of which are defined by a manufacturer of hardware used to implement the antenna modules. Generally, a higher RSSI means that the mobile device is closer to the corresponding antenna modules. The RX values are measured in Decibel-milliWatts (dBm). For example, when the mobile device is one meter (3.28 feet) away, the RX value may be −60 dBm, and when the mobile device is two meters (6.56 feet) away, the RX value may be −66 dBm. The wireless communication module uses the RSSI/RX values to determine the radial distance from the mobile device to the particular antenna modules with the RSSI decreasing in value as distance increases. In some examples, the wireless communication module uses the RSSI/RX values from multiple antenna modules to triangulate or trilaterate the location of the mobile device relative the vehicle.

Because of the layout of the antenna modules and/or interaction between the antenna modules and the antenna of the mobile device, the coverage provided by the antenna modules may result in dead zones in certain areas around the vehicle. As used herein, a "dead zone" is an area near the vehicle that is within the theoretical range of the antenna modules but, because of the geometries of the vehicle, environmental factors, the coverage areas of the antenna modules and/or the antenna geometry of the mobile device, the antenna modules cannot accurately measure the signal strength of the mobile device and/or the signals from the mobile device are not receivable by the antenna modules. For example, the aforementioned factors may cause signals from the mobile device to be reflected, absorbed, and/or distorted such that the wireless communication module cannot determine which antenna module the mobile device is closest too based on the signal strength measurements from the antenna modules. That is, in such an example, the wireless communication module cannot rely on the signal strength measurements to determine the location of the mobile device. Generally, the dead zones are within one meter of the vehicle skin. In some examples, the dead zones encompass the regions around the rear doors and the handle of a trunk or liftgate. Because the antenna modules do not accurately measure the signal strength relative to the distance of the mobile device in a dead zone, the wireless communication module cannot track the location of the mobile device within the dead zone. Adding more antenna modules to provide coverage in the dead zones adds complexity to the hardware and wiring of the vehicle, where additional mounting locations for such extra antenna modules may not be available due to packaging constraints.

As described below, the wireless communication modules tracks the movement of the mobile device and, when the mobile device enters a dead zone (e.g., the mobile device appears to be farther away when it was previously close to the vehicle, when the wireless communication module cannot determine which of the antenna modules the mobile device is closest to, etc.), the wireless communication module estimates the current location of the mobile device based on the past locations of the mobile device and/or past signal strength values measured by the antenna module. When the wireless communication module determines that the mobile device is within a dead zone, the wireless communication module generates two or more predictions of locations (sometimes referred to as "predictors") of the mobile device. In some examples, the wireless communication module uses multiple different techniques to generate the predictions of the locations of the mobile device. For example, the wireless communication module may use one or more of a linear quadratic equation, a Bayesian Net, a Neural Net, a Kalman filter, a perceptron, double exponential smoothing algorithm, and/or a Markov Chain. When the multiple predictors match, the wireless communication module so indicates to the body control module (BCM). In some examples, the multiple predictors match when the predictors indicate that the mobile device is in a passive entry zone. In some such examples, the multiple predictors match when the predictors indicate that the mobile device is within the passive entry zone and within a threshold distance (e.g., 0.33 meters, etc.) of a door handle. Alternatively, in some examples, to reduce processing, the wireless communication module uses a single predictor to determine when the mobile device in one of the dead zones is in the passive entry zone.

In response to receiving the indication from the wireless communication module along with the sensing an operator (e.g., a hand touching a door handle or a foot kicking under the fascia, etc.), the body control module enables unlocking the door(s). In some examples, the body control module enables unlocking the doors for a threshold period of time (e.g., three seconds, five seconds, ten seconds, etc.). In some examples, the body control module only enables unlocking of certain doors. In some such examples, the body control module only enables unlocking doors that are associated with dead zones (e.g., rear doors, liftgates, etc.), In some such examples, when locations of the mobile device are determinable (e.g., using trilateration, etc.), the body control module enables unlocking doors that are associated with side of the vehicle indicated by the trajectory of the mobile device. For example, if the past locations of the mobile device indicate that the trajectory of the mobile device will lead to the driver's side of the vehicle, the body control module only enables the doors on the driver's side to unlock. In some examples, when the mobile device exits the dead zone such that the antenna module(s) can accurately measure signals from the mobile device, the wireless communication module acts according to signal strength of the mobile device regardless of determinations made when the mobile device was in the dead zone.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a body control module (BCM) 102, antenna modules 104, and a wireless communication module (WM) 106.

The body control module 102 controls various subsystems of the vehicle 100. For example, the body control module 102 may control an immobilizer system, and/or power mirrors, etc. The body control module 102 is electrically coupled to circuits that, for example, drive relays (e.g., to control wiper fluid, etc.), drive brushed direct current (DC) motors (e.g., to control power seats, power locks, power windows, wipers, etc.), drive stepper motors, and/or drive LEDs, etc. In particular, the body control module 102 controls door control units that control the electronic locks and electronic windows of the vehicle 100. Additionally, the body control module 102 controls the exterior lights of the vehicle 100. When an authorized mobile device 108 is within a welcome zone (e.g., within three meters of the vehicle 100), the body control module 102 controls various subsystems of the vehicle 100 to activate in anticipation of an operator 110 entering the vehicle 100. For example, the body control module 102 may activate the exterior lights and change the position of a driver's seat in the vehicle 100. When the mobile device 108 is within a passive entry zone (e.g., within two meters of the vehicle 100), the body control module 102 primes one or more doors 112a and 112b and/or liftgate 114 of the vehicle 100 to unlock when sensors (e.g., capacitive tough sensors, infrared sensors, cameras, etc.) detect that the operator 110 touches the corresponding door/liftgate handle. In some example, the body control module 102 only primes certain doors 112a, 112b, and/or the liftgate 114. In some such examples, which doors 112a, 112b, and 114 the body control module 102 primes is based on a trajectory of the mobile device 108. For example, if the mobile device 108 is approaching the vehicle 100 from the driver's side, the body control module 102 may only prime the doors 112a and 112b on the driver's side. In examples, when the mobile device 108 is in a dead zone 116 and the expected location of the mobile device 108 is near one of the doors 112a and 112b and/or the liftgate 114, the body control module 102 only primes the doors 112b and/or liftgate 114 proximate the expected location. For example, when the wireless communication module 106 (as discussed below) estimates that the mobile device 108 is in an area around the liftgate 114 while in the corresponding the dead zone 116, the body control module 102 may only prime the liftgate 114 to unlock.

The antenna modules 104 include hardware (e.g., processors, memory, storage, antenna, etc.) and software to control wireless network interface(s). The antenna modules 104 include a communication controller for a personal or local area wireless network (e.g., Bluetooth®, Bluetooth® Low Energy (BLE), Zigbee®, Z-Wave®, Wi-Fi®, etc.). In some examples, when the antenna modules 104 are configured to implement BLE, the antenna modules 104 may be referred to as "BLE Antenna Modules (BLEAMs)." The antenna modules 104 communicatively couple to the mobile device 108 and measure and/or receive measurements of the signal strength of the signals broadcast by the mobile device 108. In some examples, the vehicle 100 includes one or more internal antenna modules (not shown) located inside a cabin of the vehicle 100 to facilitate determining when the mobile device 108 is within the cabin of the vehicle 100 (e.g., to enable a passive start function of the vehicle 100).

In the illustrated example, the antenna modules 104 receive signals from the mobile device 108 in coverage areas 118. As used herein, the coverage areas 118 encompass locations at which the corresponding antenna module 104 can accurately measure signals from the mobile device 108 (e.g., measure the signals that are not substantially distorted, absorbed, and/or reflected). The shapes of the coverage areas 118 are defined by the characteristics of the antenna, the mounting location of the antenna modules 104 on the vehicle 100, and the geometry of conductive portions of the vehicle 100. In the illustrated example, areas around the vehicle 100 that are not covered by one or more of the coverage areas 118 are the dead zones 116 in which the antenna modules 104 cannot accurately measure the broadcasts from the mobile devices 108. The area encompassed by the dead zones 116 is also influenced by the antenna of the mobile device 108. In the illustrated example, handles of the rear doors 112b and the liftgate 114 are within the dead zones 116.

The wireless communication module 106 is communicatively coupled to the antenna modules 104 to track a location of the mobile device 108 relative to the vehicle 100. In some examples, when the antenna modules 104 are configured to implement BLE, the wireless communication module 106 may be referred to as "BLE Module (BLEM)." The wireless communication module 106 receives and analyzes the signal strength measurements between the antenna modules 104 and the mobile device 108, based on these measurements, the wireless communication module 106 determines (a) whether the mobile device 108 is within a range of the vehicle 100, (b) when in range, a location of the mobile device 108 relative to the vehicle 100, (c) if the mobile device 108 is within one of the dead zones 116, and (d) when in one of the dead zones 116, the estimated location of the mobile device 108. In the illustrated example, the wireless communication module 106 includes a dead zone manager 120

The dead zone manager 120 analyzes the signal strength measurements from the mobile device 108 that are received by the antenna modules 104. Periodically (e.g., every 500 milliseconds, every second, etc.), the dead zone manager 120 stores a sample of the signal strength measurement in memory (e.g., in the memory 206 of FIG. 2 below). In some examples, the dead zone manager 120 collects the signal strength measurements starting when the mobile device 108 is within range and ending when one of the doors 112a and 112b and/or liftgate 114 opens. When the mobile device 108 is in one or more of the coverage areas 118, the dead zone manager 120 calculates a distance between the mobile device 108 and the vehicle 100. In some examples, the dead zone manager 120 calculates a radial distance when the mobile device 108 is detected by one of the antenna modules 104. In some examples, the dead zone manager 120 uses triangulation or trilateration to determine the location of the mobile device 108 when signals from the mobile device are detect by multiple antenna modules 104. Using the location of the mobile device 108, the dead zone manager 120 determines when the mobile device 108 is within a zone of interest (e.g., the welcome zone, the passive start zone, etc.) and sends a message so indicating to the body control module 102.

The dead zone manager 120 determines when the mobile device 108 enters one of the dead zones 116. In some examples, the dead zone manager 120 determines that the mobile device 108 has entered one of the dead zones 116 when the previous signal strength measurements indicate that the mobile device 108 was previously moving towards the vehicle 100 and the mobile device 108 was not near the edge of the range of the coverage areas 118. In some examples, the dead zone manager 120 determines that the mobile device 108 has entered one of the dead zones 116 when the dead zone manager 120 cannot determine which of the antenna modules 104 the mobile device 108 is closest to, based on multiple signal strength measurements from the antenna modules 104. When the mobile device 108 enters one of the dead zones, the dead zone manager 120 estimates the current location of the mobile device 108 based on past signal strength values associated with the mobile device 108 stored in memory 206.

The dead zone manager 120 generates one or more predictors of the location of the mobile device 108 using models generated using data gathered by mapping signal strength of the mobile device 108 as it transitions from various ranges of interest (such as the welcome zone, the passive entry zone, out of range, in the dead zone, etc.). When more than one predictor is generated, the dead zone manager 120 uses a different model to generate each of the predictors. In some examples, the behavior of the mobile device 108 is determined by a third party (e.g., a car manufacturer, a component manufacturer, etc.). In some such examples, the behavior is measured for different models of mobile devices so that particular models are generated for particular models and/or manufacturers of mobile devices 108. Alternatively, in some examples, the behavior of the particular mobile device 108 is measured over time as the mobile device 108 interacts with the antenna modules 104. In such an example, the models are developed over time and are custom to the mobile device 108 of the operator 110. In some examples, the dead zone manager 120 includes at least two models generated using different algorithms.

In some examples, the models are generated using a quadratic linear equation, a Kalman filter algorithm, a double exponential smoothing algorithm, a Markov Chain algorithm, a Bayesian Net algorithm, a neural net algorithm, and/or a perceptron algorithm, etc. The models use information regarding the mobile device 108 to generate the predictors, such as (a) the states or zones (e.g., the welcome zone, the passive entry zone, being in range of the antenna modules 104, etc.) that the mobile device 108 was in previously, (b) the history of the signal strength measurements of the antenna modules 104, (c) the current signal strength measurements of the antenna modules 104, and/or (d) sensor measurements that detect the presence of the operator 110 (e.g., door handle sensors, etc.). For example, a Markov Chain model may define five states which characterize the relationship of the mobile device 108 to the vehicle 100. In such an example, the Markov Chain model may define an in-range state (e.g., the mobile device 108 is in the communication range of the vehicle 100), an out-of-range state (e.g., the mobile device 108 is not in the communication range of the vehicle 100), approach detection state (e.g., the mobile device 108 is within the welcome zone), a passive entry state (e.g., the mobile device 108 is within the passive entry zone), and an indeterminate state. In such examples, the Markov Chain model may define transitions between the defined states based on the (a) the states or zones (e.g., the welcome zone, the passive entry zone, being in range of the antenna modules 104, etc.) that the mobile device 108 was in previously, (b) the history of the signal strength measurements of the antenna modules 104, (c) the current signal strength measurements of the antenna modules 104, and/or (d) sensor measurements that detect the presence of the operator 110 (e.g., door handle sensors, etc.). The transition probability are experimentally determines in a variety of conditions that are known to result in dead spots. In such an example, to generate a predictor, the inputs into the Markov Chain model produce a final state. For example, when the final state is the passive entry state, the predictor indicates that the mobile device 108 is in the passive entry zone even when the wireless communication module 106 cannot determine the current location of the mobile device 108 because it is in a dead zone 116.

The dead zone manager 120 generates one or more predictors using that models that are estimates of the location of the mobile device 108 within one of the dead zones 116. In some examples, the dead zone manager 120 generates one predictor and uses that predictor as the basis to deciding whether the mobile device 108 is within the passive entry zone. In some example, the dead zone manager 120 generates multiple predictors. For example, a first predictor may be generated using a Kalman filter-based model and a second predictor may be generated using a Markov Chain-based model. The dead zone manager 120 estimates the location of the mobile device 108 when the predictors substantially match (e.g., are within 0.25 meters of the same location, indicate that the mobile device 108 is within the same zone, etc.). The dead zone manager 120 then treats the mobile device 108 as if it is at the location indicated by the predictors. The dead zone manager 120 uses that location to determine which, if any, zone that the mobile device 108 is in. The dead zone manager 120 continues to estimate the location of the mobile device 108 until it determines that the mobile device 108 is no longer in one of the dead zones 116. In some examples, the dead zone manager 120 periodically (e.g., every 500 milliseconds, every second, etc.) generates the predictors and estimates the location of the mobile device 108 with respect to the vehicle 100 regardless of whether the mobile device 108 is within one of the dead zones 116. In such examples, the dead zone manager 120 uses the most previously generated predictors to estimate the location of the mobile device 108.

In some examples, when multiple antenna modules 104 receive broadcasts from the mobile device 108 when the mobile device is not in one of the dead zones 116, the dead zone manager 120 estimates the location of the mobile device 108 in both dimensions of a horizontal plane using trilateration based on the distances between the antenna modules 104 being known. Additionally, the distance to the mobile device 108 is calculated from a line orthogonal to a line between the two antenna modules 104. When the mobile device 108 enters one of the dead zones 116, the dead zone manager 120 determines the current location ($D_P$) based on a previous known location ($D_N$) and a time difference ($\Delta t$) between the time at the previous location and the time at the current location (sometime referred to as a "time step"). In some example, the current location ($D_P$) is calculated using Equation (1) below.

$$D_P = D_N - V_N * \Delta t + A_N * (\Delta t)^2 \qquad \text{Equation (1)}$$

In Equation (1) above, the $V_N$ is the velocity of the mobile device 108 and $A_N$ is the acceleration of the mobile device 108 (e.g., both measured based on previous location determinations, etc.). In some examples, the broadcasts from the mobile device 108 are received by three or more antenna modules 104 that facilitate performing redundant trilateration. In such examples, the dead zone manager 120 (a) averages the estimated locations, (b) uses the highest signal strength measurement, and/or (c) calculates a weighted average of the signal strength measurements based on the location on the vehicle 100 of the corresponding antenna modules 104. In some examples, the dead zone manager 120 uses this method to determine when the mobile device 108 enters one of the dead zones 116. In some examples, when the mobile device 108 is not in one of the dead zones 116, the dead zone manager 120 (a) calculates the location of the mobile device 108 using the signal strength measurements, (b) predicts the location of the mobile device 108 using Equation (1) above, and (c) averages the calculation and the prediction to determine the location of the mobile device 108.

Figure 2:
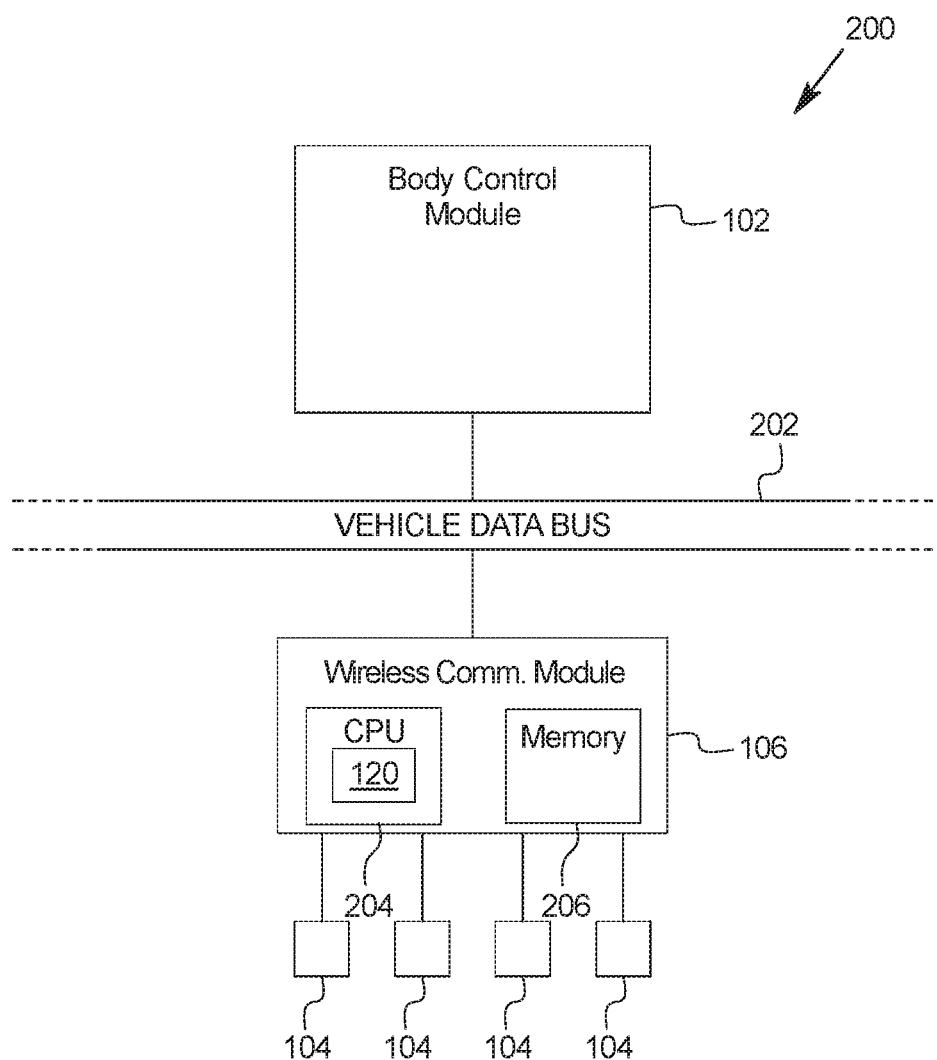
FIG. 2 is a block diagram of electronic components of the vehicle of FIG. 1.

FIG. 2 is a block diagram of electronic components 200 of the vehicle 100 of FIG. 1. In the illustrated example, the electronic components 200 includes the body control module 102, the antenna modules 104, the wireless communication module 106, and a vehicle data bus 202.

The wireless communication module 106 includes a processor or controller 204 and memory 206. In the illustrated example, the wireless communication module 106 is structured to include the dead zone manager 120. Alternatively, in some examples, the dead zone manager 120 is incorporated into another electronic control unit (ECU) with its own processor and memory, such as the body control module 102. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the body control module 102 and the wireless communication module 106. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
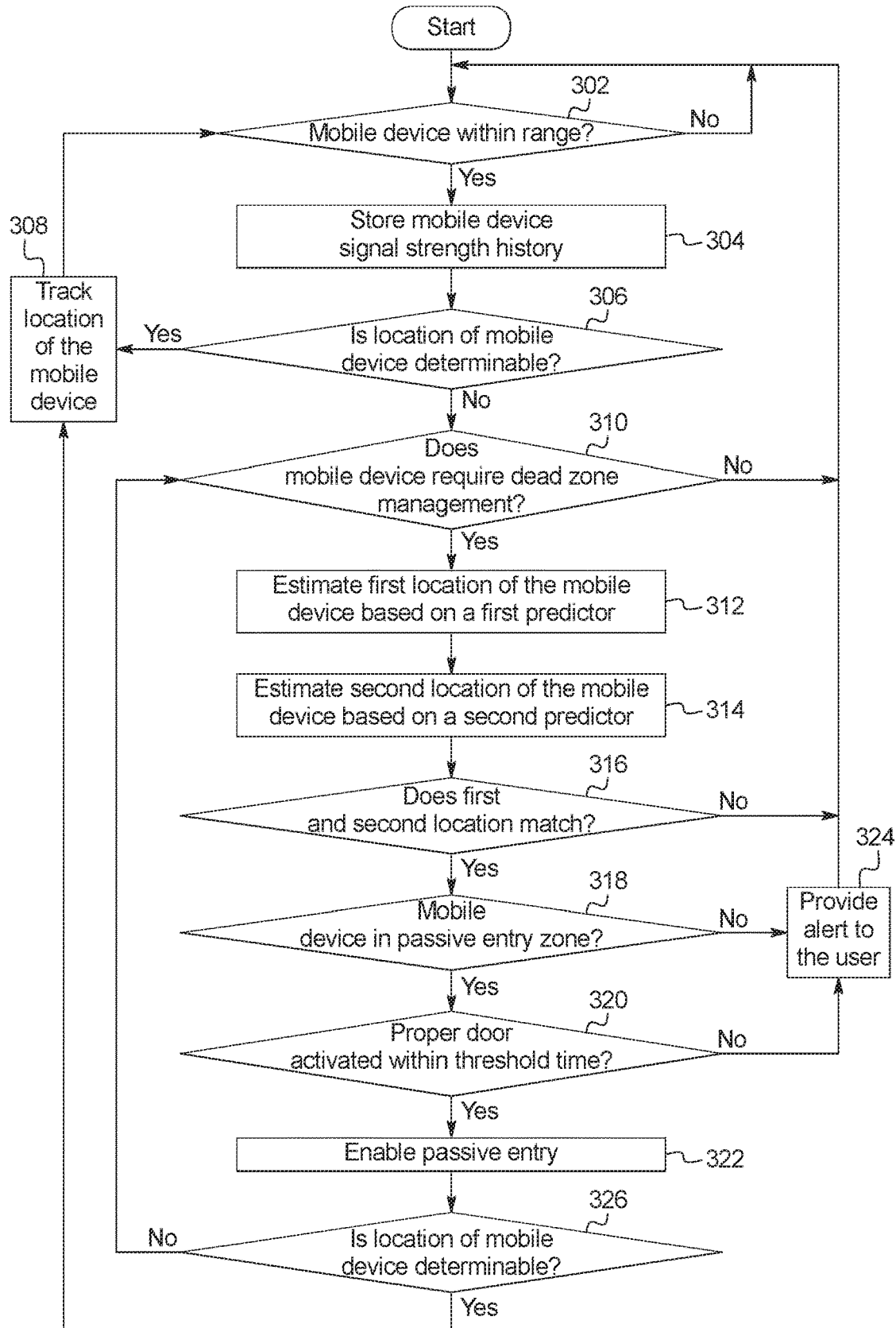
FIG. 3 is a flowchart of a method to mitigate passive entry dead zones, which may be implemented by the electronic components of FIG. 2.

FIG. 3 is a flowchart of a method to mitigate passive entry dead zones 116, which may be implemented by the electronic components 200 of FIG. 2. Initially, at block 302, the dead zone manager 120 waits until the mobile device 108 is in range. At block 304, when the mobile device 108 is within range, the dead zone manager 120 stores the signal strength measurements from the mobile device 108 in memory. At block 306, the dead zone manager 120 determines whether the location or zone of the mobile device 108 is determinable (e.g. whether the mobile device 108 is possibly within one of the dead zones 116) based on the signal strength measurements from the antenna modules 104. For examples, the dead zone manager 120 may not be able to determine the location or zone of the mobile device 108 when the signal strength measurements from the antenna modules 104 are close enough that the dead zone manager 120 cannot determine which antenna modules 104 the mobile device 108 is closest to. When the location of the mobile device 108 is determinable, the method continues to block 308. Otherwise, the location of the mobile device 108 is not determinable, the method continues at block 310. At block 306, the dead zone manager 120 determines the location of the mobile device 108 relative to the vehicle 100 based on the signal strength measurement.

At block 310, the dead zone manager 120 determines whether the model of the mobile device 108 requires dead zone management. For example, the wireless communication module 106 may store a list of mobile devices 108 in memory that have connectivity issues that contribute to the dead zones 116. Alternatively or additionally, in some examples, the dead zone manager 120 learns over time whether the particular mobile device 108 has connectivity issues. For example, the dead zone manager 120 may generate a map of signal strength measurements received from the mobile device 108 and determine that the mobile device 108 has low signal strength measurements at some locations near the vehicle 100. As another example, when the PaaK system is setup, the dead zone manager 120, via an application executing on the mobile device 108, may instruct the operator 110 to walk a predefined route around the vehicle 100 to determine whether there are dead zones 116 around the vehicle 100. When the mobile device 108 has connectivity issues, the method continues at block 312. Otherwise, when the mobile device 108 does not have connectivity issues, the method returns to block 302.

At block 312, the dead zone manager 120 generates a first estimated location of the mobile device 108 based on a first predictor. The first predictor is generated using a first model, such as a Kalman filter, an enhanced Kalman filter, or a double exponential smoothing algorithm. At block 314, the dead zone manager 120 generates a second estimated location of the mobile device 108 based on a second predictor that is different that the first predictor. The second predictor is generated using a second model, such as a Markov Chain algorithm or a Bayesian net algorithm or a neural net network. At block 316, the dead zone manager 120 determines whether the first and second locations match. The first and second locations match, for example, when the first and second locations are within a threshold distance of each other or when the first and second predictors indicate that the mobile device 108 is in the same zone. Alternatively, in some example, the first and second locations match, for example, when the first and second locations are within the same one of the dead zones 116. When the first and second locations match, the method continues at block 318. Otherwise, then the first and second locations do not match, the method continues at block 302.

At block 318, the dead zone manager 120 determines whether the mobile device 108 is within the passive entry zone based on the estimated location of the mobile device 108. When the mobile device 108 is within the passive entry zone, the method continues at block 320. Otherwise, when the mobile device 108 is not within the passive entry zone, the method continues at block 324. At block 320, the dead zone manager 120 determines whether one of the doors 112a and 112b and/or liftgate 114 of the vehicle 100 has been activated and/or touched within a threshold period of time (e.g., three seconds, five seconds, ten seconds, etc.). When one of the doors 112a and 112b and/or liftgate 114 of the vehicle 100 has been activated and/or touched within the threshold period of time, the method continues to block 322. Otherwise, when one of the doors 112a and 112b and/or liftgate 114 of the vehicle 100 has not been activated and/or touched within the threshold period of time, the method continues at block 324.

At block 322, the dead zone manager 120 instructs the body control module 102 to enable passive entry (e.g., unlock the door 112a and 112b or liftgate 114. At block 324, the dead zone manager 120 provides an alert to the operator 110. In some examples, the nature of the alert signifies which error condition (e.g., the first and second location not matching, the mobile device not being in the passive entry zone, the door not being activated within the threshold time, etc.) is communicated through the alert. In some examples, to provide the alert, the dead zone manager 120 instructs the body control module 102 to produce and audio or visual alert using lights of the vehicle 100 and/or sound generating devices (e.g., horns, speakers, etc.) on the vehicle 100.

At block 326, the dead zone manager 120 determines whether the location or zone of the mobile device 108 is determinable based on signal strength measurements. For example, the operator 110 may have moved the mobile device 110 out of the dead zone 116 since the last determination. When the location or zone of the mobile device 108 is determinable, the method returns to block 308. Otherwise, when the location or zone of the mobile device 108 is not determinable, the method returns to block 310.

The flowchart of FIG. 3 is representative of machine readable instructions stored in memory (such as the memory 206 of FIG. 2) that comprise one or more programs that, when executed by a processor (such as the processor 204 of FIG. 2), cause the wireless communication module 106 and/or, more generally, the vehicle 100 to implement the example dead zone manager 120 of FIGS. 1 and 2. Further, although the example program(s) is/are described with reference to the flowchart illustrated in FIG. 3, many other methods of implementing the example dead zone manager 120 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   antenna modules to determine signal strengths of communication with a mobile device;
   a wireless module to:
      when the mobile device is in a dead zone, generate first and second predictors, wherein the first and second predictors are estimated locations of the mobile device within the dead zone, wherein the dead zone is an area within a theoretical communication range of the antenna modules where the wireless module cannot determine the location of the mobile device based on the signal strengths of the communication with the mobile device;
      enable passive entry when the first and second predictors match and indicate that the mobile device is in a passive entry zone, and a sensor detects a user; and
   a body control module to unlock a door when passive entry is enabled.

2. The vehicle of claim 1, wherein coverage areas of the antenna modules define the dead zone.

3. The vehicle of claim 1, wherein before the mobile device enters into the dead zone, the wireless module is to track the location of the mobile device based on the measured signal strength.

4. The vehicle of claim 3, wherein the wireless module is to store the measured signal strength for generating the first and second predictors.

5. The vehicle of claim 1, wherein the wireless module is to:
   generate the first predictor using a first model; and
   generate the second predictor using a second model, the second model being generated using a different technique than the first model.

6. The vehicle of claim 5, wherein the first and second models are generated using at least two of a Kalman filter, a Bayesian Net, double exponential smoothing algorithm, a Markov chain, or a linear quadratic equation.

7. The vehicle of claim 1, wherein, when the first and second predictors match, the wireless module is to enable passive entry for a limited amount of time.

8. The vehicle of claim 1, wherein, when the first and second predictors match, the wireless module is to enable passive entry for the door proximate the dead zone.

9. A method comprising:
   determining, with antenna modules of a vehicle, signal strength measurements of broadcasts from a mobile device;
   upon determining that the mobile device is in a dead zone near the vehicle, generating multiple predictors that are estimated locations of the mobile device within the dead zone with a wireless module that includes a processor and memory, wherein the dead zone is an area within a theoretical communication range of the antenna modules where the wireless module cannot determine the location of the mobile device based on the signal strengths measurements of the broadcasts from the mobile device;
   enabling, with the wireless module, passive entry when the multiple predictors match within a passive entry zone near a door of the vehicle; and
   unlocking, with a body control module, the door when passive entry is enabled and a sensor detects a user is touching a handle of the door.

10. The method of claim 9, wherein the dead zone is an area proximate the vehicle where the antenna modules do not accurately measure the signal strength of the broadcasts from the mobile device.

11. The method of claim 10, wherein coverage areas of the antenna modules define the dead zone.

12. The method of claim 9, including, to determine when the mobile device enters into the dead zone, tracking, with the wireless module, the mobile device based on the signal strength measurements before the mobile device enters into the dead zone.

13. The method of claim 12, including storing, in memory, the signal strength measurements to use to generate the multiple predictors.

14. The method of claim 9, including:
generating a first one of the multiple predictors using a first model; and
generating a second one of the multiple predictors using a second model, the second model being generated using a different technique than the first model.

15. The method of claim 14, wherein the first and second models are generated using at least two of a Kalman filter, a Bayesian Net, double exponential smoothing algorithm, a Markov chain, or a linear quadratic equation.

16. The method of claim 9, wherein the each of the multiple predictors is generated using a different model.

17. The method of claim 9, wherein when the multiple predictors match, enabling passive entry for a limited amount of time.

18. The method of claim 9, wherein when the multiple predictors match, enabling passive entry for the door proximate the dead zone.

19. A vehicle comprising:
antenna modules to determine signal strengths of communication with a mobile device;
a controller to generate first and second estimated locations of the mobile device upon determining the mobile device is within a dead zone, wherein the dead zone is an area within a theoretical communication range of the antenna modules where the controller cannot determine the location of the mobile device based on the signal strengths of the communication with the mobile device; and
a body control module to unlock a door responsive to the controller determining:
the first and second estimated locations match within the passive entry zone; and
a sensor detects a user in the passive entry zone.

* * * * *